United States Patent
Sung et al.

(10) Patent No.: US 7,711,386 B2
(45) Date of Patent: May 4, 2010

(54) APPARATUS AND METHOD FOR SELECTIVE POWER CONTROL FOR AN OFDM MOBILE COMMUNICATION SYSTEM

(75) Inventors: Sang-Hoon Sung, Suwon-si (KR); Joong-Ho Jeong, Seoul (KR); Yun-Sang Park, Suwon-si (KR); Soon-Young Yoon, Seongnam-si (KR); Jae-Hwan Chang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1164 days.

(21) Appl. No.: 10/993,274

(22) Filed: Nov. 19, 2004

(65) Prior Publication Data

US 2005/0105589 A1    May 19, 2005

(30) Foreign Application Priority Data

Nov. 19, 2003   (KR) .................... 10-2003-0082265

(51) Int. Cl.
    *H04B 7/00*    (2006.01)
(52) U.S. Cl. .............. 455/522; 455/69; 455/452.2; 455/424; 455/67.11; 375/130; 375/260; 370/203
(58) Field of Classification Search ............ 455/522, 455/69, 450–452.2, 67.11–67.14, 423–425; 370/203, 310, 32; 375/130, 260
    See application file for complete search history.

(56) References Cited

U.S. PATENT DOCUMENTS

| 5,602,835 | A  | * | 2/1997  | Seki et al. ............... 370/206 |
| 5,893,035 | A  | * | 4/1999  | Chen ........................ 455/522 |
| 5,893,036 | A  | * | 4/1999  | Trandai et al. .............. 455/522 |
| 6,118,983 | A  | * | 9/2000  | Egusa et al. ................. 455/69 |
| 6,131,016 | A  | * | 10/2000 | Greenstein et al. ........... 455/69 |
| 6,549,784 | B1 | * | 4/2003  | Kostic et al. ............... 455/501 |
| 6,721,569 | B1 | * | 4/2004  | Hashem et al. ............. 455/450 |
| 6,748,222 | B1 | * | 6/2004  | Hashem et al. ............. 455/453 |
| 6,760,590 | B2 | * | 7/2004  | Miyoshi et al. .......... 455/452.1 |
| 6,799,053 | B2 | * | 9/2004  | Miyoshi et al. ............. 455/522 |
| 7,010,322 | B2 | * | 3/2006  | Kim et al. .................. 455/522 |
| 7,151,740 | B2 | * | 12/2006 | Zhang et al. ................ 370/208 |
| 7,236,748 | B2 | * | 6/2007  | Li et al. ........................ 455/69 |
| 7,257,410 | B2 | * | 8/2007  | Chun et al. ................. 455/455 |
| 7,330,446 | B2 | * | 2/2008  | Lee et al. .................... 370/318 |

(Continued)

FOREIGN PATENT DOCUMENTS

KR    102002004083    5/2002

*Primary Examiner*—Sharad Rampuria
(74) *Attorney, Agent, or Firm*—The Farrell Law Firm, LLP

(57) ABSTRACT

Disclosed is a method for controlling downlink power transmitted from a base station to subscriber stations in a mobile communication system employing an Orthogonal Frequency Division Multiple Access (OFDMA) scheme, in which data is carried from the base station to the subscriber stations by subchannels to each of which a plurality of subcarriers are assigned. The method includes the steps of receiving from the subscriber stations channel condition information of each of the subchannels together with information related to a subcarrier having a channel condition below a threshold from among at least one subcarrier included in each of the subchannels; calculating transmission power for each of the subchannels based on the received information; and transmitting each of the subchannels with the calculated transmission power, excluding the subcarrier having a channel condition below the threshold.

6 Claims, 10 Drawing Sheets

U.S. PATENT DOCUMENTS

| | | |
|---|---|---|
| 7,372,910 B2 * | 5/2008 | Suh et al. .................... 375/260 |
| 7,388,920 B2 * | 6/2008 | Nam et al. .................. 375/260 |
| 7,463,576 B2 * | 12/2008 | Krishnan et al. ............ 370/203 |
| 7,539,123 B2 * | 5/2009 | Rhodes ....................... 370/208 |
| 7,570,953 B2 * | 8/2009 | Maltsev et al. .............. 455/450 |
| 7,596,167 B2 * | 9/2009 | Hamalainen et al. ........ 375/130 |
| 2003/0087662 A1 | 5/2003 | Miyoshi et al. |
| 2003/0161285 A1 * | 8/2003 | Tiedemann et al. ......... 370/332 |
| 2003/0223354 A1 * | 12/2003 | Olszewski ................... 370/208 |
| 2004/0166887 A1 * | 8/2004 | Laroia et al. ................ 455/522 |
| 2005/0032514 A1 * | 2/2005 | Sadri et al. .................. 455/423 |
| 2006/0087972 A1 * | 4/2006 | Jalali et al. .................. 370/232 |

\* cited by examiner

APPARATUS AND METHOD FOR SELECTIVE POWER CONTROL FOR AN OFDM MOBILE COMMUNICATION SYSTEM

PRIORITY

This application claims priority under 35 U.S.C §119 to an application entitled "Apparatus and Method for Selective Power Control for an OFDM Mobile Communication System" filed in the Korean Industrial Property Office on Nov. 19, 2003 and assigned Serial No. 2003-82265, the contents of which are hereby incorporated by reference.

BACKGROUND OF THE INVENTION

1. Field of the Invention

The present invention relates to a mobile communication system, and more particularly to an apparatus and a method for performing a downlink power control in a mobile communication system employing an Orthogonal Frequency Division Multiplexing (OFDM) scheme.

2. Description of the Related Art

The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal subcarriers (or subcarrier channels) before being transmitted.

The OFDM scheme, similar to an existing Frequency Division Multiplexing (FDM) scheme, boasts of an optimum transmission efficiency during high-speed data transmission because the OFDM scheme transmits data on subcarriers, while maintaining orthogonality among them. The optimum transmission efficiency is further attributed to efficient frequency use and robustness against multipath fading in the OFDM scheme.

More specifically, overlapping frequency spectrums lead to efficient frequency use and robustness against frequency selective fading and multipath fading. The OFDM scheme reduces the effects of the inter-symbol interference (ISI) by use of guard intervals and enables the design and use of a simple equalizer hardware structure. Furthermore, because the OFDM scheme is robust against impulse noise, it is increasingly popular in communication systems.

A structure of a conventional communication system employing an OFDM scheme will be described with reference to FIG. 1.

FIG. 1 is a block diagram of a transmitter and a receiver of a conventional OFDM mobile communication system. The OFDM mobile communication system includes a transmitter 100 and a receiver 150.

The transmitter 100 includes an encoder 104, a symbol mapper 106, a serial-to-parallel converter 108, an Inverse Fast Fourier Transform (IFFT) unit 110, a parallel-to-serial converter 112, a guard interval inserter 114, a digital-to-analog converter 116, and a radio frequency (RF) processor 118.

In the transmitter 100, information data bits 102 including user data bits and control data bits are input to the encoder 104. Upon receiving the signal of the information data bits, the encoder 104 encodes the signal through a predetermined coding scheme and sends the coded signal to the symbol mapper 106. During the coding, the encoder 104 may employ a convolution coding scheme or a turbo coding scheme having a predetermined coding rate. The symbol mapper 106 modulates the coded bits from the encoder 104 into modulated symbols according to a predetermined modulation scheme and sends the modulated symbols to the serial-to-parallel converter 108. The predetermined modulation scheme includes a BPSK (binary phase shift keying) scheme, a QPSK (quadrature phase shift keying) scheme, a 16QAM (quadrature amplitude modulation) scheme, or a 64 QAM (quadrature amplitude modulation) scheme.

Upon receiving the serial modulated symbols from the symbol mapper 106, the serial-to-parallel converter 108 converts the serial modulated symbols into parallel symbols and sends the parallel symbols to the IFFT unit 110. Upon receiving the signals from the serial-to-parallel converter 108, the IFFT unit 110 performs N-point IFFT on the signals and sends the signals to the parallel-to-serial converter 112.

Upon receiving the signals from the IFFT unit 110, the parallel-to-serial converter 112 converts the signals into serial signals and sends the serial signals to the guard interval inserter 114. The guard interval inserter 114, which has received the serial signals from the parallel-to-serial converter 112, inserts guard intervals into the serial signals and sends the signals to the digital-to-analog converter 118. The guard interval is inserted to remove interference between a previous OFDM symbol transmitted at a previous OFDM symbol time and a current OFDM symbol to be transmitted at a current OFDM symbol time in an OFDM communication system.

Generally, null data is inserted into the guard interval. In this case, however, when a receiver incorrectly estimates a start point of an OFDM symbol, interference occurs between the subcarriers, causing an increase in an incorrect estimation rate for the received OFDM symbol. To more accurate the start point a cyclic prefix method or a cyclic postfix method is used. In the cyclic prefix method, a predetermined number of end samples of an OFDM symbol in a time domain are copied and inserted into a valid OFDM symbol. In the cyclic postfix method, a predetermined number of beginning samples of an OFDM symbol in a time domain are copied and inserted into a valid OFDM symbol.

Upon receiving the signals from the guard interval inserter 114, the digital-to-analog converter 116 converts the signals into analog signals and sends the analog signals to the RF processor 118. The RF processor 118 includes a filter and a front end unit. The RF processor 118 transmits the signals output from the digital-to-analog converter 116 over the air through a transmission antenna after RF-processing the signals.

A structure of the receiver 150 will now be described. The structure of the receiver 150 is generally a reverse of the structure of the transmitter 100.

The receiver 150 includes an RF processor 152, an analog-to-digital converter 154, a guard interval remover 156, a serial-to-parallel converter 158, an Fast Fourier Transform (FFT) unit 160, a channel estimator 162, an equalizer 164, a parallel-to-serial converter 166, a symbol demapper 168, and a decoder 170.

In the receiver 150, the signal transmitted from the transmitter 100, together with the noise that is added to the signal while the signal passes through a multipath channel, is received via a reception antenna. The signal received through the reception antenna is input into the RF processor 152. The RF processor 152 down-converts the signal received through the reception signal into a signal having an intermediate frequency band and sends the down-converted signal to the analog-to-digital converter 154. The analog-to-digital converter 154 converts the analog signal from the RF processor 152 into a digital signal and sends the digital to the guard interval remover 156.

Upon receiving the digital signal from the analog-to-digital converter 154, the guard interval remover 156 removes the guard interval from the digital signal and sends the serial signal to the serial-to-parallel converter 158. The serial-to-parallel converter 158 converts the serial signal into parallel signals and sends the parallel signals to the FFT unit 160. The FFT unit 160 performs an N-point FFT on the parallel signals and sends the FFT-processed signals to the equalizer 164 and the channel estimator 162. The equalizer 164 receives the signals from the FFT unit 160, performs channel equalization on the signals by means of channel information estimated by the channel estimator 162, and then sends the channel-equalized signals to the parallel-to-serial converter 166. The parallel-to-serial converter 166 converts the parallel signals received from the equalizer 164 into a serial signal and sends the serial signal to the symbol demapper 168.

In the meantime, the signal output from the FFT unit 160 is also input into the channel estimator 162. Then, the channel estimator 162 detects pilot symbols or preamble symbols from the signal input from the FFT unit 160, performs channel estimation by means of the pilot symbols or the preamble symbols, and then sends the channel estimation result to the equalizer 164. In addition, the receiver 150 generates a channel quality indicator (CQI) corresponding to the channel estimation result of the channel estimator 162 and sends the generated CQI to the transmitter 100 through a CQI transmitter (not shown).

The symbol demapper 168 demodulates the signal output from the parallel-to-serial converter 166 through a predetermined demodulation scheme and sends the demodulated signal to the decoder 170. Upon receiving the demodulated signal from the symbol demapper 168, the decoder 170 decodes the demodulated signal through a predetermined decoding scheme, and then, outputs information data bits 172. The demodulation and decoding schemes employed in the receiver 150 correspond to the modulation and coding schemes employed in the transmitter 100.

A mobile communication system employing the OFDM scheme requires the feedback of the CQI information from a receiver for downlink power control. For the downlink power control, a transmitter (i.e., a base station) may transmit data known to both parties to a receiver (i.e., a subscriber station), thereby facilitating the channel estimation. That is, for the channel estimation process, a signal known to both the transmitter and the receiver (for example, preamble signal or pilot signal) is transmitted.

The signal for the channel estimation may be either a preamble signal including all of the subcarriers in one symbol period or a pilot signal including at least one subcarrier in one symbol period for relatively high power transmission.

The CQI information feedback process for power control by using a pilot signal in a typical OFDM communication system will be described.

FIG. 2 is a graph illustrating positions at which pilot signals are transmitted in a frequency domain of a typical OFDM communication system. Referring to FIG. 2, in the OFDM communication system, one OFDM symbol includes a plurality of subcarriers, each of which carries a pilot signal 201 or a data signal 203. In contrast, in the case of the preamble signal described above, all subcarriers included in one OFDM symbol carry pilot symbols, respectively. The following description will be based on an assumption that the CQI information is acquired from pilot signals carried by some of the subcarriers in each symbol. However, the fedback CQI information can be obtained in the same manner from the preamble signal using all of the subcarriers.

Here, it is natural that the number of the subcarriers constituting each OFDM symbol may be optionally determined according to conditions of the system.

As shown in FIG. 2, the pilot signals are carried by subcarriers at predetermined positions from among the subcarriers of the OFDM symbol. For example, in the FIG. 2, the subcarriers colored in black carry the pilot signals and the subcarriers colored in white carry the data signals. The subcarriers for carrying the pilots signals will be referred to as 'pilot subcarriers' and the subcarriers for carrying the data signals will be referred to as 'data subcarriers'.

A conventional OFDM communication system is a fixed wireless communication system in which subscriber stations or receivers are fixed at particular positions. In the fixed OFDM wireless communication system, the subscriber stations determines the CQI for each of all subcarriers received from the base station or the transmitter and feedbacks the CQI to the base station. Here, the CQI may be a Signal to Noise Ratio (SNR) or a Signal to Interference and Noise Ratio (SINR). The following description will be given on an assumption that the CQI is the SINR.

As shown in FIG. 2, the pilot signals are carried only by the pilot subcarriers at predetermined positions in a typical OFDM symbol. Therefore, the receivers must know in advance both the predetermined positions of the pilot subcarriers transmitted from the transmitter and the pilot signals carried by the pilot subcarriers. Here, the pilot signals have a predetermined sequence, and the pilot sequence is defined as a sequence for the pilot signals in a protocol agreed to between the transmitter and the receiver.

The receiver calculates channel gains in corresponding subcarriers from the received signals carried by the pilot subcarriers and interpolates the channel gain in each of the pilot subcarriers, thereby obtaining estimation values for the channel gains of the data subcarriers other than the pilot subcarriers. Further, the receiver obtains SINRs of the pilot subcarriers by dividing the estimation values for the channel gains of the data subcarriers by the noise energy. The SINRs of all of the subcarriers obtained in the way as described above, that is, CQIs are feedback to the base station. Then, the base station controls the transmission power for the corresponding subcarriers by using the CQIs feedback from the subscriber station.

The above description is based on a presumption that the subcarriers once assigned to the subscriber stations remain unchanged by channel conditions, because a typical OFDM system is a fixed wireless communication system. Meanwhile, the currently developing 4G mobile communication system is now evolving into a cellular system employing an Orthogonal Frequency Division Multiple Access (OFDMA) scheme instead of the OFDM/TDMA (Time Division Multiple Access) scheme. In an OFDMA system, a particular set of subcarriers or subchannels assigned to the subscriber stations may use different subchannels in a next transmission time interval, in order to equalize the interference between the adjacent cells for the operation in a multi-cell cellular system.

Further, the presumption that the subcarriers remain unchanged due to the channel conditions is an incorrect model for a wireless communication system reflecting the mobility of the subscriber stations. That is, it is reasonable that the subcarriers assigned to mobile subscriber stations have continuously changing channel conditions and are subjected to continuously changing interference by an adjacent cell. Therefore, the mobile subscriber stations can normally use the existing power control method only when the changing CQI is feedback for each of the subcarriers whenever it changes. However, the frequent feedback of the CQI for all of the subcarriers may cause signaling overhead and the signaling required to feedback the CQI for the subcarriers may serve as uplink interference.

In order reduce such overhead, a method of feedbacking only an average SINR for each subchannel was proposed. However, the of feedback of only the average SINR cannot actively proceed against frequency selective fading due to a multi-path fading channel and sometimes cannot avoid passively using a low channel coding rate to reduce data error generation. The use of a low channel coding rate inevitably decreases the transmission speed. Therefore, there is a need for a method for efficiently controlling the transmission power in a mobile communication system employing the OFDMA scheme.

Hereinafter, a process of controlling the downlink power by feedbacking a CQI for each of the subcarriers will be described in detail with reference to FIG. 3.

FIG. 3 illustrates a process of downlink power control in a conventional mobile communication system.

Referring to FIG. 3, a base station (BS) transmits to a subscriber station (SS) training signals known to both the base station and the subscriber station as described above, for example, preamble signals or pilot signals (step 301). The subscriber station having received the pilot signals measures the SINRs from the pilot signals (step 303). The subscriber station performs the measurement of the SINRs only for the subcarriers carrying the pilot signals instead of performing the measurement for all of the subcarriers. Further, the subscriber station estimates the SINRs for the data subcarriers not carrying the pilot signals by interpolating the measured SINRs for the pilot subcarriers.

The SINRs measured by the subscriber station, which is the CQI information, are feedback to the base station (step 305), and the transmission power for each of the subcarriers is revised based on the feedback CQI information for each of the subcarriers (step 307). As a result, the base station can transmit the data signals at the revised transmission power to the subscriber station (step 309).

In the OFDMA system, data is carried by each of the subcarriers assigned to subscriber stations, which is comprised of multiple subcarriers. Therefore, the power control as described above requires feedback of the channel quality information or the CQI information for each of the subscriber stations.

FIGS. 4A and 4B are graphs showing SINRs of subcarriers in corresponding subchannels of different subscriber stations in the same time period.

FIG. 4A is a graph showing the SINRs of six subcarriers included in a subchannel A assigned to subscriber station A and FIG. 4B is a graph showing the SINRs of six subcarriers included in a subchannel B assigned to subscriber station B.

FIGS. 4A and 4B illustrate that the subcarriers of the subchannels A and B have SINRs all of which are different from each other. Therefore, a considerably large quantity of CQI information is necessary to conduct the power control for each of the subcarrriers assigned to each of the subscriber stations. It is usual that feedback of an average SINR of the subcarriers in each subchannel is used for the power control. For example, in the case shown in FIGS. 4A and 4B, an average SINR for the six subcarriers is feedback as CQI information of the corresponding subchannel in order to conduct the power control.

As noted from FIGS. 4A and 4B, the third subcarrier in the subscriber station A (i.e. subchannel A) and the fourth and fifth subcarriers in the subscriber station B (i.e. subchannel B) have SINRs much lower than the SINRs of the other subcarriers. The use of the average value between the subchannels may be very inefficient and incorrect.

Further, if the power control is based on the third subcarrier in the subchannel A having a relatively much lower SINR, that is, if all of the subcarriers in the same subchannel A are transmitted with the same power as that for the third subcarrier in the subchannel A, it may be impossible to normally decode a signal transmitted to a subcarrier in a bad channel condition.

SUMMARY OF THE INVENTION

Accordingly, the present invention has been made to solve at least the above-mentioned problems occurring in the prior art, and an object of the present invention is to provide a method and an apparatus for performing an effective downlink power control in an OFDMA mobile communication system.

It is another object of the present invention to provide a method and an apparatus for effectively assigning the transmission power for each subchannel in an OFDMA mobile communication system.

It is another object of the present invention to provide a method and an apparatus for generating feedback information for performing the effective assignment of transmission power for each subchannel in an OFDMA mobile communication system.

In accordance with one aspect of the present invention, there is provided a method for controlling downlink power transmitted from a base station to subscriber stations in a mobile communication system employing an Orthogonal Frequency Division Multiple Access (OFDMA) scheme, in which data is carried from the base station to the subscriber stations by subchannels to each of which a plurality of subcarriers are assigned. The method comprises the steps of receiving from the subscriber stations channel quality information of each of the subchannels together with information related to a subcarrier having a channel quality below a predetermined threshold from among at least one subcarrier included in each of the subchannels, calculating transmission power for each of the subchannels, excluding the subcarrier having a channel quality below the predetermined threshold from among at least one subcarrier included in each of the subchannels based on the received information and transmitting each of the subchannels based on the calculated transmission power.

In accordance with another aspect of the present invention, there is provided an apparatus for controlling downlink power transmitted from a base station to subscriber stations in a mobile communication system employing an OFDMA scheme, in which data is carried from the base station to the subscriber stations by subchannels to each of which a plurality of subcarriers are assigned. The apparatus comprises a subchannel controller for receiving from the subscriber stations channel quality information of each of the subchannels together with information related to a subcarrier having a channel condition below a predetermined threshold from among at least one subcarrier included in each of the subchannels, and calculating transmission power for each of the subchannels based on the received information, a subchannel mapper for mapping the data to each of the subchannels, excluding the subcarrier having a channel quality below the predetermined threshold from among said at least one subcarrier included in each of the subchannels and a power converter for converting the transmission power for each of the subchannels based on the calculated transmission power.

In accordance with another aspect of the present invention, there is provided a method for feedbacking information for downlink power control in a mobile communication system employing an OFDMA scheme, in which data is carried from a base station to subscriber stations by subchannels to each of which a plurality of subcarriers are assigned. The method comprises the steps of measuring a channel quality of each of the subchannels based on signals for power control transmitted from the base station, searching for a subcarrier having a channel condition below a predetermined threshold from among at least one subcarrier included in each of the subchannels and feedbacking to the base station channel quality information of each of the subchannels and information of the subcarrier having a channel condition below the predetermined threshold.

In accordance with another aspect of the present invention, there is provided an apparatus for feedbacking information for downlink power control in a mobile communication system employing an OFDMA scheme, in which data is carried from a base station to subscriber stations by subchannels to each of which a plurality of subcarriers are assigned. The apparatus comprises a subchannel selector for selecting a subchannel to be assigned to a subscriber station from among the subchannels received from the base station, a power control information generator for measuring a channel quality of each of the subchannels based on signals for power control transmitted from the base station, searching for a subcarrier having a channel condition below a predetermined threshold from among at least one subcarrier included in each of the subchannels, and feedbacking to the base station channel condition information of each of the subchannels and information of the subcarrier having a channel condition under the particular threshold.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

Hereinafter, preferred embodiments of the present invention will now be described in detail herein below with reference to the annexed drawings. In the following description, a detailed description of known functions and configurations incorporated herein has been omitted for conciseness.

The present invention may be applied to communication systems employing either an OFDM scheme or an OFDMA scheme. Further, the present invention can be applied to such systems regardless of whether the systems employ a Time Division Duplex (TDD) scheme or a Frequency Division Duplex (FDD) scheme.

The present invention may be applied to communication systems employing either an OFDM scheme or an OFDMA scheme. Further, the present invention can be applied to such systems regardless of whether the systems employ a Time Division Duplex (TDD) scheme and a Frequency Division Duplex (FDD) scheme.

According to the present invention, when a subscriber station receives signals from a base station, the subscriber station obtains SINRs for each subchannel and index information of power-controlled subcarrier from the received signals. Then, a DownLink Power Control (DLPC) which is a power control for signal transmission from the base station to the subscriber station is carried out using the obtained information. For the DLPC, the subscriber station feedbacks the measured power control information to the base station and the base station performs the power control corresponding to a required Quality of Service (QoS) based on the feedback power control information by using a power control algorithm according to the present invention.

Also, the present invention increases a degree of freedom in transmission power control for each subcarrier in the OFDM/OFDMA system and decreases the quantity of power control information (overhead) to be feedback to the base station from the subscriber station, thereby facilitating the implementation of a cellular mobile communication system.

According to the power control method according to the present invention, the information feedback to the base station from the subscriber station for the power control includes not only the channel quality information of each subchannel but also includes information related to some of the subcarriers in the subchannel, which have channel conditions less than a threshold.

A method for controlling transmission power of a base station according to the present invention will be described with reference to FIG. 5.

Figure 1:
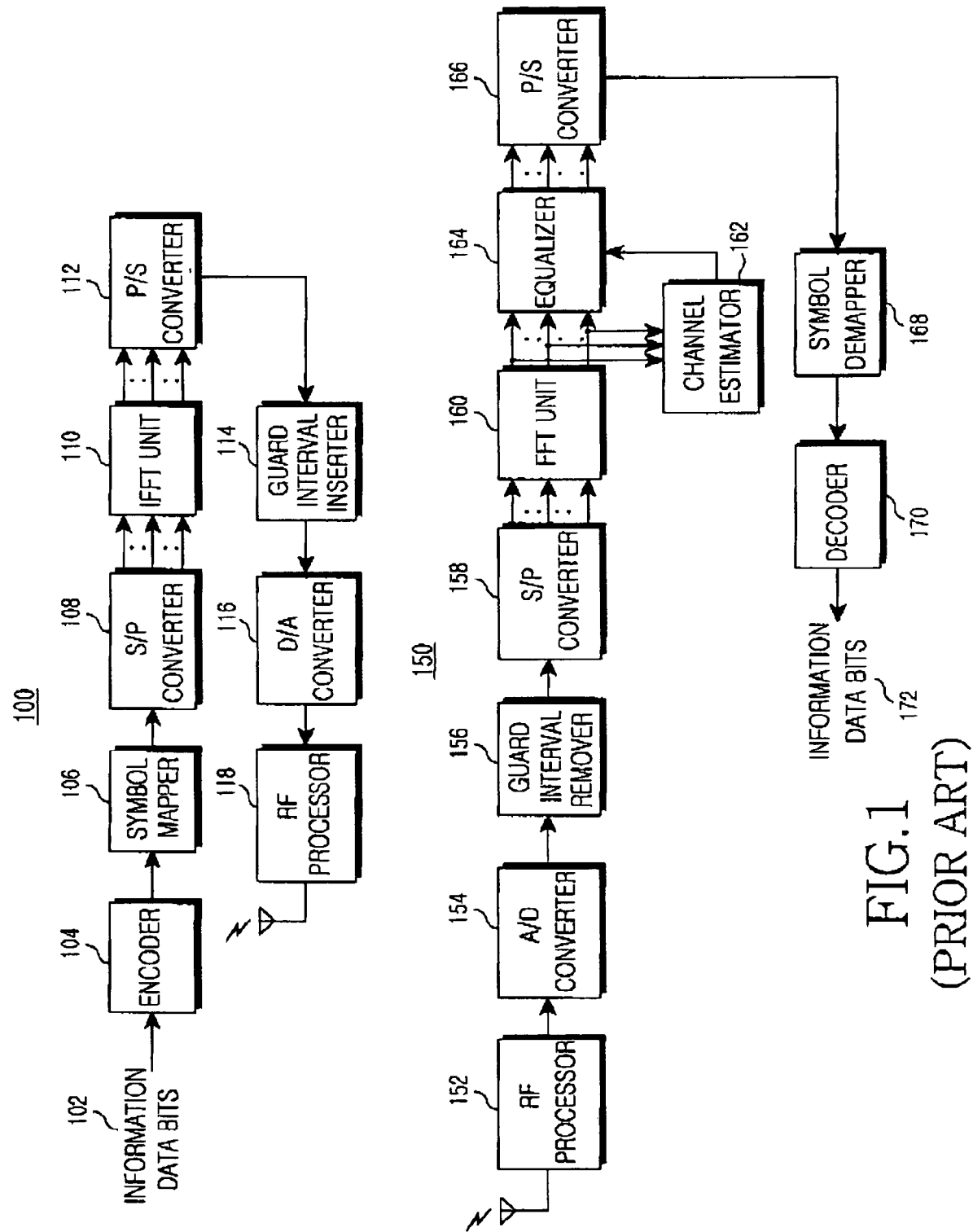
FIG. 1 is a block diagram of a transmitter and a receiver of a conventional OFDM mobile communication system.
Figure 2:
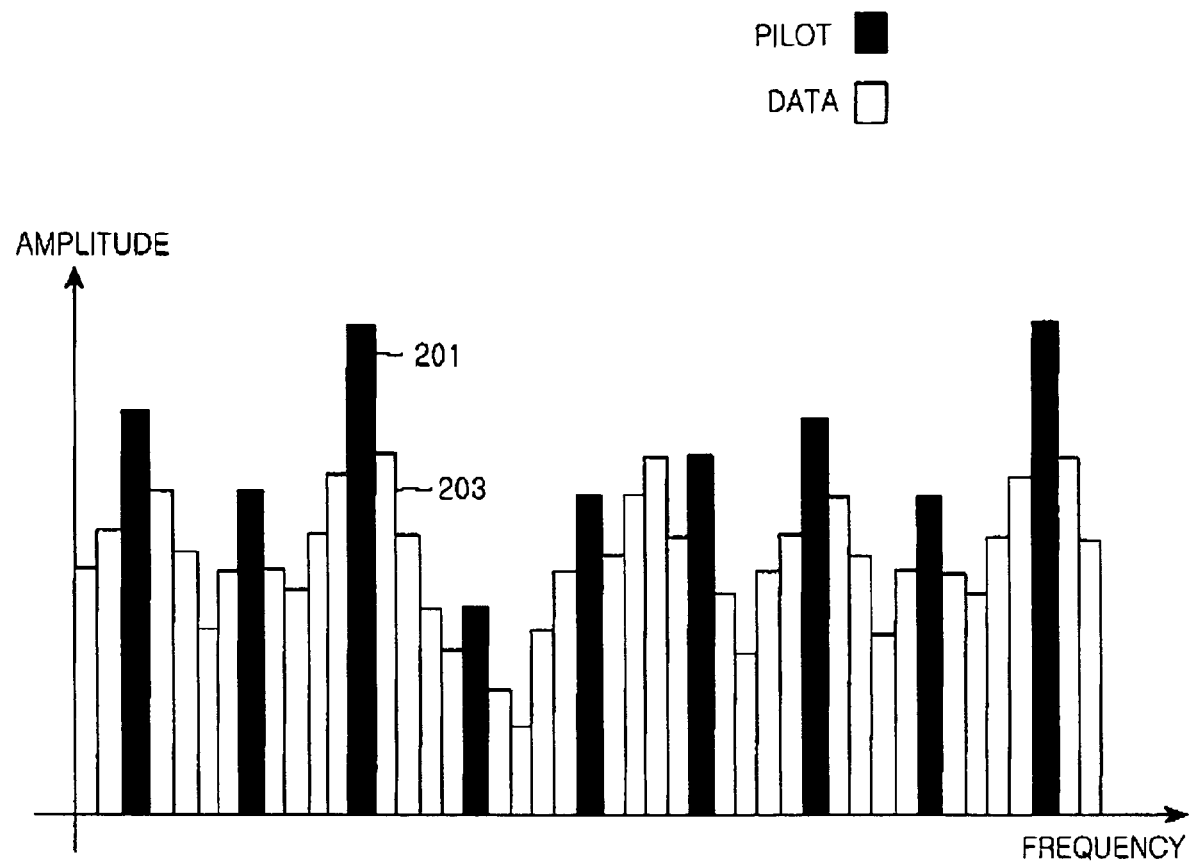
FIG. 2 is a graph illustrating positions at which pilot signals are transmitted in a frequency domain of a typical OFDM communication system.
Figure 3:
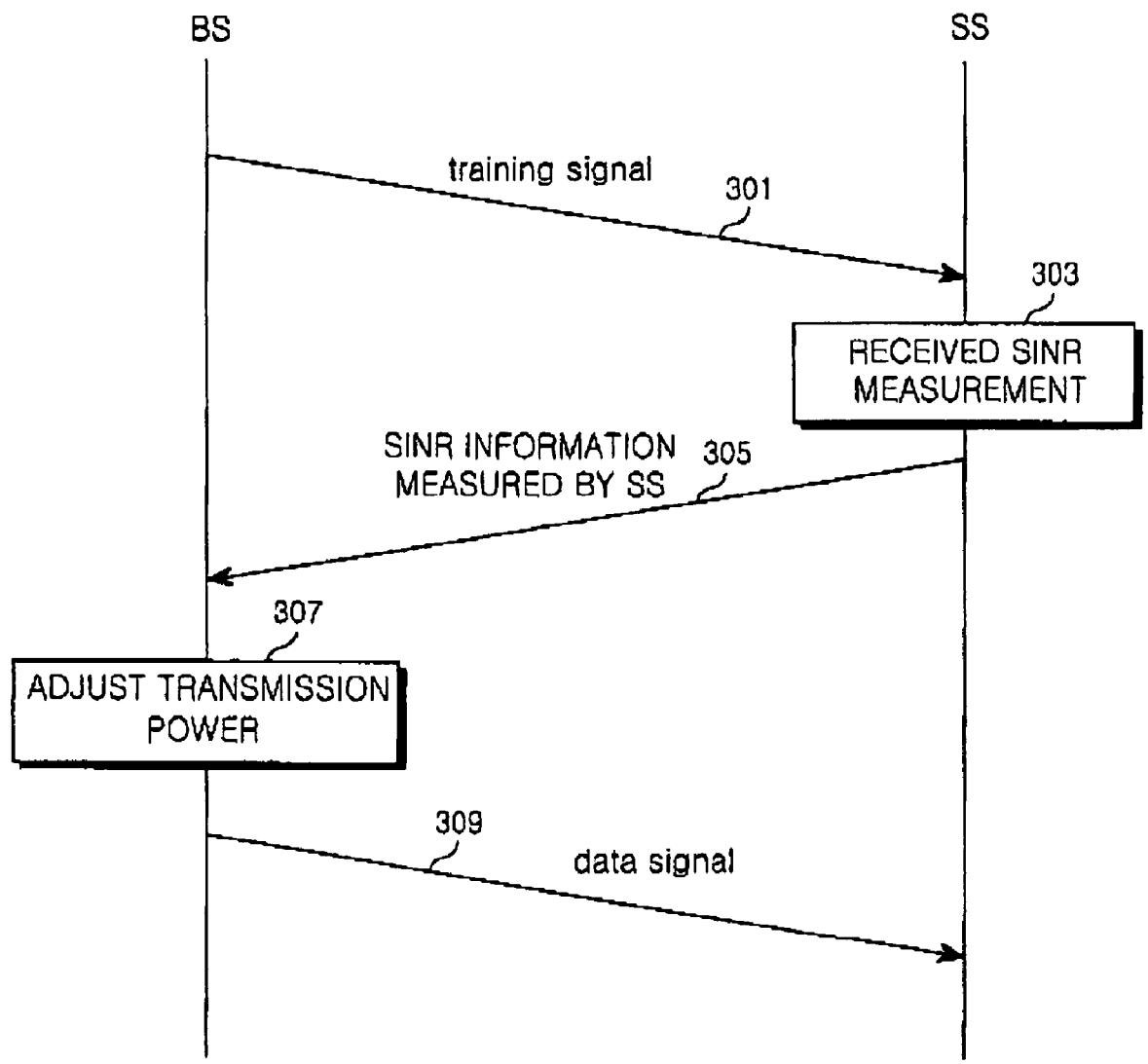
FIG. 3 illustrates a process of the downlink power control in a conventional mobile communication system.
Figure 4A:
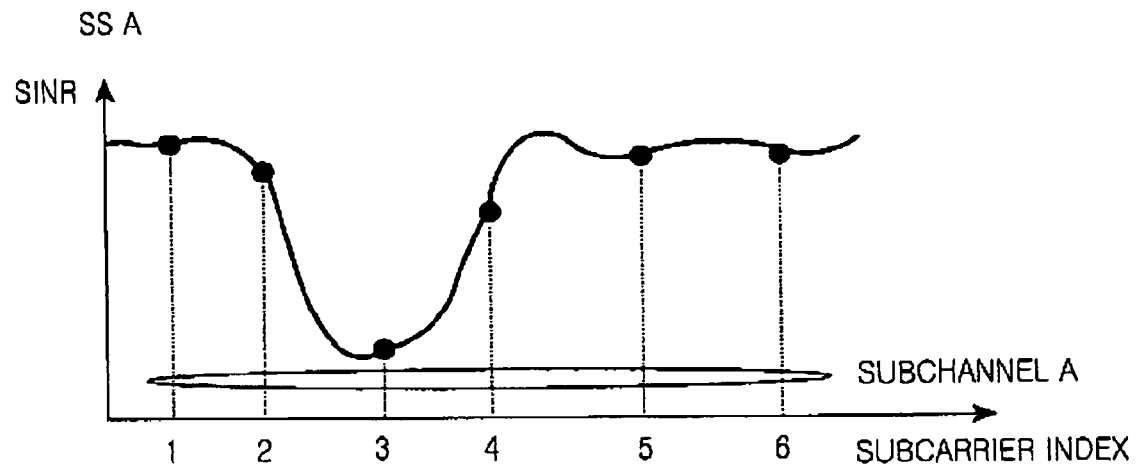
FIGS. 4A and 4B are graphs showing SINRs of subcarriers in corresponding subchannels of different subscriber stations in the same time period.
Figure 4B:
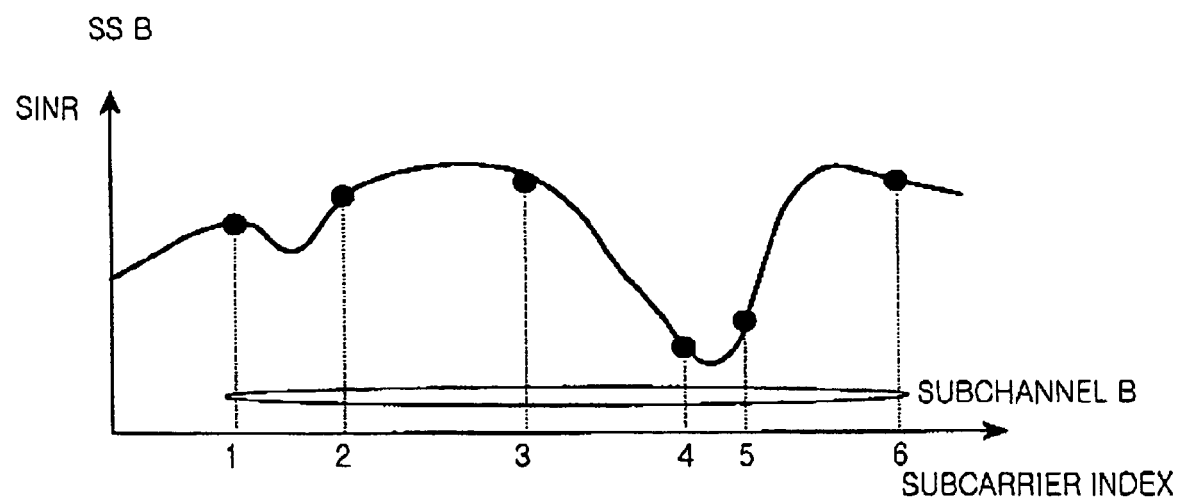
Figure 5:
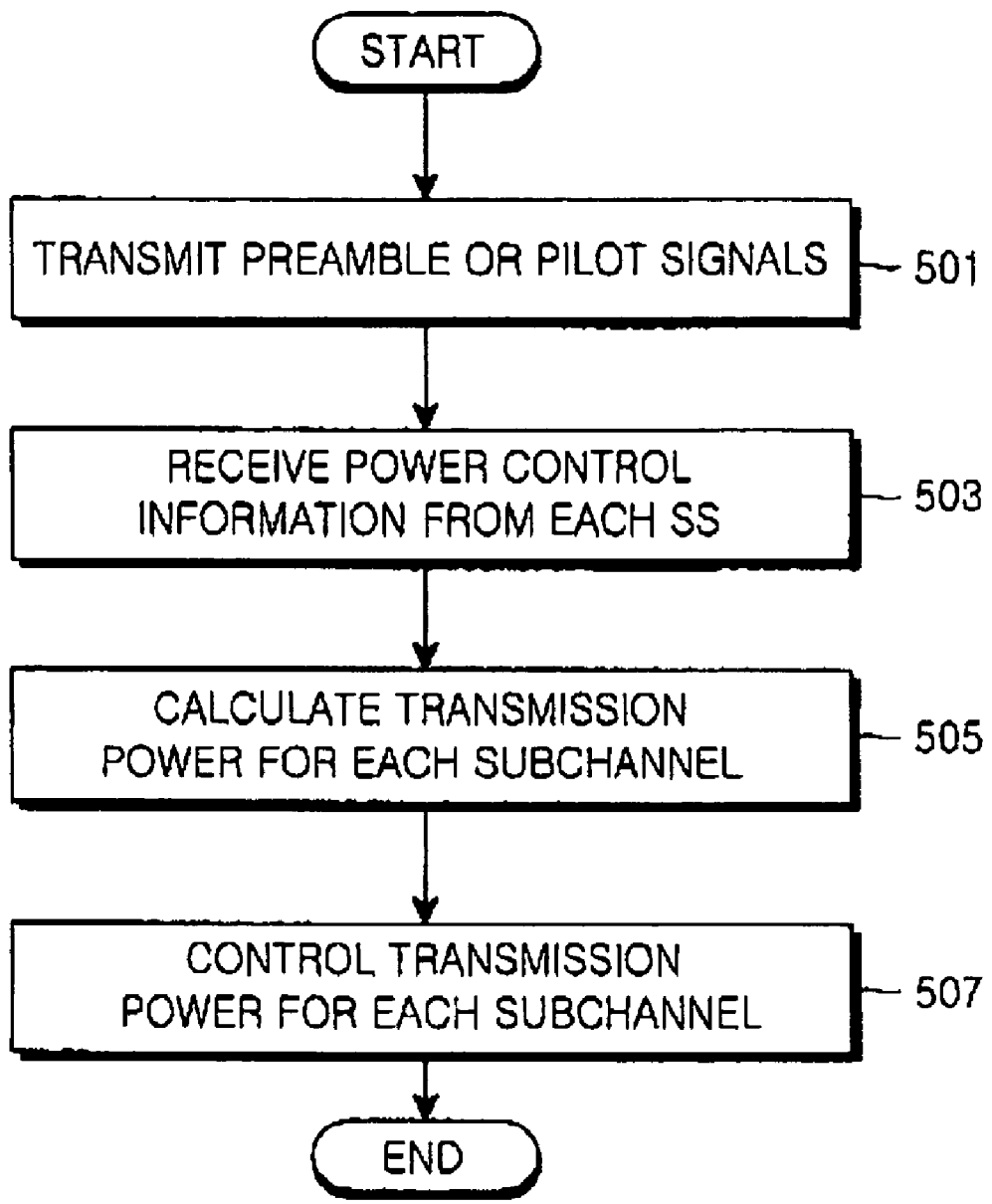
FIG. 5 is a flowchart of a transmission power control method of a base station for each subchannel according to an embodiment of the present invention.

FIG. 5 is a flowchart of a transmission power control method of a base station for each subchannel according to an embodiment of the present invention.

A base station transmits preamble signals or pilot signals to the subscriber stations (step 501). In the following description, the signal used for the power control is assumed to be a pilot signal. Upon receiving the pilot signals, the subscriber stations measure the CQI information for each subchannel from the received pilot signals and feedbacks information related to the subcarriers having SINRs less than a predetermined threshold to be used as power control information.

The base station receives the power control information from the subscriber stations (step 503) and calculates the transmission power for each subchannel based on the received power control information (including the CQI information for each subchannel and information related to the subcarriers having SINRs under the predetermined threshold) (step 505).

The base station then transmits the data while controlling the transmission power for each subchannel according to the calculated transmission power (step 507). In order to increase the efficiency in use of the subchannels, the subcarriers having SINRs less than the threshold are not used in transmitting the data.

The number of subcarriers in each of the subchannels is reduced due to the unused subcarriers in each of the subchannels. However, the transmission power for the other subcarriers (the transmitted subcarriers) can be increased up to the total transmission power available. Further, the transmission efficiency can be improved because the subcarriers having SINRs less than the predetermined threshold, which are highly probable to cause transmission error, are not transmitted.

Figure 6A:
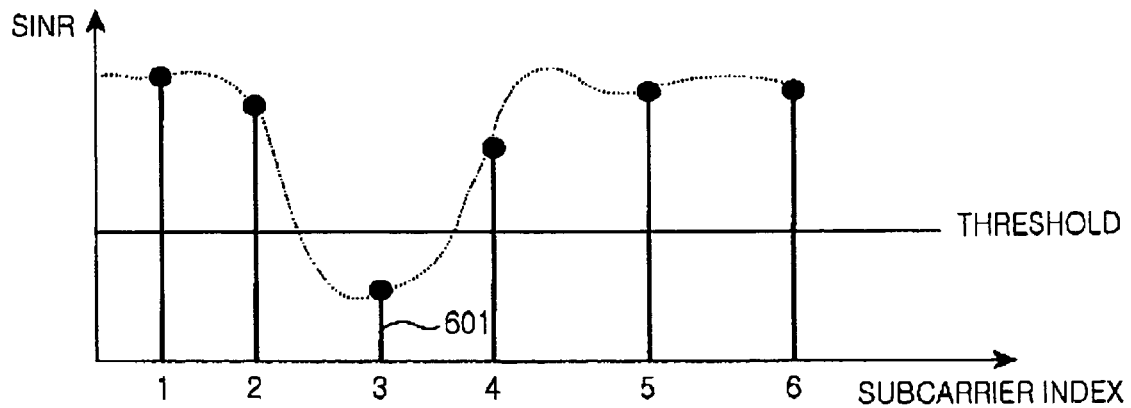
FIGS. 6A and 6B are graphs for illustrating a method for assigning the transmission power to each subchannel according to an embodiment of the present invention.
Figure 6B:
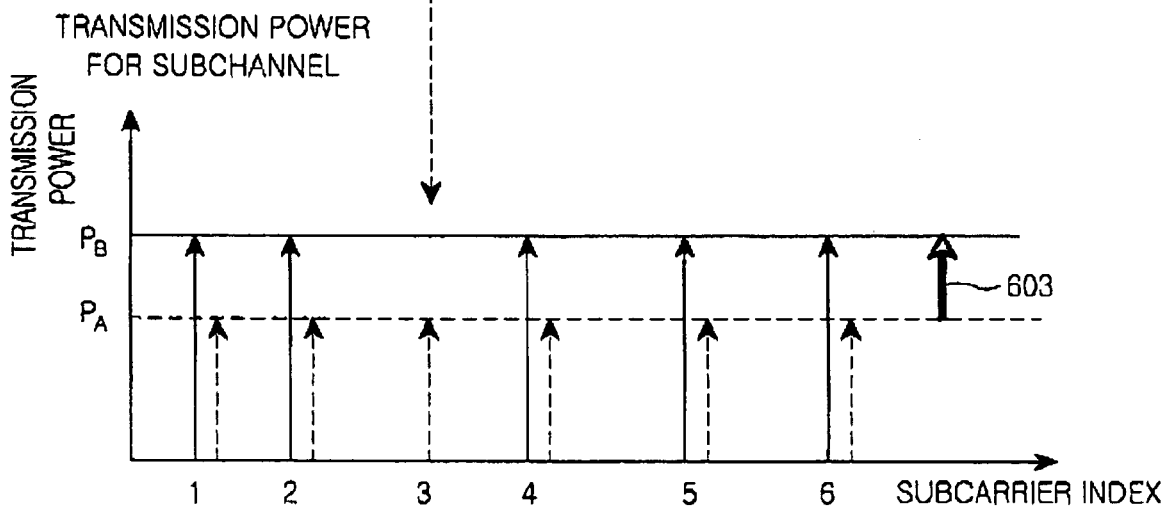

FIGS. 6A and 6B are graphs for illustrating a method for assigning the transmission power to each subchannel according to an embodiment of the present invention.

FIG. 6A is a graph illustrating the SINRs for each subcarrier in a particular subchannel measured by a particular subscriber station, and FIG. 6B is a graph for describing a concept of calculating the transmission power based on the measured SINRs for the subchannel.

Before a description of FIGS. 6A and 6B is given, it will be assumed that the entire frequency band of an OFDMA system according to the present invention is divided into a plurality of subchannels each of which includes a plurality of subcarriers each of which carries a data signal or a pilot signal. Here, it is assumed that the subcarriers shown in FIGS. 6A and 6B carry pilot signals, although the subcarriers shown may carry preamble signals if they correspond to all of the subcarriers in a particular subchannel.

Of course, the number of the subcarriers in the entire frequency band of an OFDMA system according to the present invention may be variably set according to a system condition. For convenience of the description on FIGS. 6A and 6B, it will be assumed that one subchannel is comprised of six subcarriers dispersed in the entire frequency band.

The SINRs of the subcarriers shown in FIG. 6A have variable channel conditions due to the mobility of the subscriber station of the OFDMA communication system which is not a fixed wireless communication system but a mobile wireless communication system. Because the multi-cell interference has time-varying intensity for each subcarrier, the SINR measured by the subscriber station also becomes time-varying. In order to achieve an efficient communication reflecting the variance of the SINRs, the CQI information showing the condition of the SINRs should be frequently reported. In the following description, it is assumed that the SINR is used as the CQI information.

Referring to FIG. 6, a receiver (i.e. subscriber station) has in advance an information sequence transmitted to the pilot subcarriers of each subchannel transmitted by the transmitter (i.e. base station). The receiver obtains channel gains in the pilot subcarriers by dividing the power levels of the signals carried to the receiver by the power levels of the pilot subcarriers by the pilot signals transmitted to the pilot subcarriers. The receiver interpolates the obtained channel gains in the pilot subcarriers, thereby obtaining channel gain estimation values. The receiver divides each of the channel gain estimation values in the subcarriers by the noise energy, thereby obtaining the SINRs of the subcarriers. The receiver calculates an average of the SINRs of the subcarriers in each of the subchannels and feedbacks to the base station a calculated average SINR of each subchannel.

Further, according to the present invention, the SINRs are examined for each of the subcarriers in each of the subchannels and only the information related to subcarriers in bad channel conditions are feedback to the base station, so that more efficient power control and channel use becomes possible.

As noted from FIGS. 6A and 6B, the frequency response intensities of the subcarriers in the shown frequency band have large differences due to the frequency selective fading. In the present invention, several unused frequency-varying virtual subcarriers are selected from each of the subchannels and are then feedback. The subcarriers which are in bad channel conditions and are excluded from the transmitted subcarriers in the transmitted subchannels will be referred to as 'frequency-varying virtual subcarriers' or 'virtual subcarriers'.

According to the present invention as described above, not only the average SINRs of the subchannels but also frequency-varying virtual subcarriers information of each subchannel is feedback to the base station, thereby improving the efficiency in the power control.

For example, the third subcarrier 601 from among the six subcarriers shown in the graph of FIG. 6A has an SINR which does not exceed a predetermined threshold. Therefore, the SINR of the subchannel (i.e. an average of the SINRs of the six subcarriers) together with the information related to the third subcarrier of the subchannel is feedback to the base station. In this case, the third subcarrier corresponds to a frequency-varying virtual subcarrier.

Referring to the graph of FIG. 6B, because the base station has received a report from the subscriber station that the third subcarrier has a bad channel condition, the base station transmits the subchannel excluding the third subcarrier 601.

If a transmission power of $P_A$ can be assigned to all of the subcarriers in the subchannel (i.e. six subcarriers) including the subcarrier under the threshold, a transmission power of $P_B$ greater than $P_A$ can be assigned to the available subcarriers in the subchannel (i.e. five subcarriers) excluding the subcarrier having the SINR that is less than the threshold. That is, by excluding the subcarrier with the SINR less than the threshold, which is expected to generate channel error due to its bad channel condition, the transmission power for the other subcarriers can be increased by the difference of $(P_B-P_A)$ shown as reference 603.

A method of acquiring the information feedback from the subscriber station to the subscriber station for downlink power control, which includes the SINR of each subchannel and information on the subcarrier(s) that are less than a predetermined threshold in the subchannel, i.e. frequency-varying virtual subcarrier(s), will be described in detail.

First, parameters used in the following equations are defined. $Subch_A$ denotes a subchannel assigned to a subscriber station A. When the subchannel A or $Subch_A$ includes M subcarriers, a set of the M subcarriers is expressed as $\{f_{A,1}, f_{A,2}, \ldots, f_{A,M}\}$. An average SINR measured in the subchannel A during a particular time period $[nT, (n+1)T]$ is expressed as $SINR_{Subch_A}(n)$.

When the information feedback from the subscriber station to the subscriber station for downlink power control as described above is $DLPC_{element}$, $DLPC_{element}$ can be expressed as shown below in Equation (1).

$$DLPC_{element} = \{SINR_{Subch_A}(n), Set_A\} \quad (1)$$

In Equation (1), $SINR_{Subch_A}(n)$ denotes an average SINR of the subchannel A measured during a particular time period

[nT, (n+1)T], in which T denotes an OFDMA symbol period. Further, the $Set_A$ denotes a set of feedback virtual subcarriers of the subchannel A, that is, a set of frequency indexes of the subcarriers under a predetermined threshold.

A process of determining the $Set_A$ will be described in detail. First, the threshold for the SINRs necessary in order to determine the $Set_A$ is defined as below in Equation (2).

$$threshold_A = \overline{SINR}_{Subch_A} + DLPC_{threshold} \quad (2)$$

In Equation (2), $\overline{SINR}_{Subch_A}$ represents the average SINR of the subchannel and $DLPC_{threshold}$ represents a difference between an allowable average subchannel SINR having the same value for all subchannels in a same cell, which is a value specific to each cell determined according to a cellular system design taking into in consideration the environmental conditions of the cellular system (e.g. urban area or rural area), a supported cellular radius, mobility of subscriber stations, etc.

$\overline{SINR}_{Subch_A}$ in Equation (2) can be calculated by Equation (3) below.

$$\overline{SINR}_{Subch_A} = \frac{\sum_{m=1}^{M} P_{signal, f_{A,M}}}{\sum_{m=1}^{M} P_{interference-and-noise, f_{A,m}}} \quad (3)$$

In Equation (3), on an assumption that the subchannel A includes M subcarriers, $P_{signal, f_{A,M}}$ refers to the intensity of a desired signal of the $m^{th}$ subcarrier in the subchannel A excluding noise, and $P_{interference-and-noise, f_{A,m}}$ refers to intensity of noise of the $m^{th}$ subcarrier in the subchannel A excluding the desired signal.

The total number of the subcarriers which do not exceed the threshold of Equation (2) from among the M subcarriers in the subchannel A can be calculated as shown below in Equation (4).

$$J_A \in \{0,1,2,\ldots,M\} \quad (4)$$

In Equation (4), $J_A$ is the total number of the virtual subcarriers in the subchannel A, and M is the number of all of the subcarriers in the subchannel A.

In Equation (4), the total number of the virtual subcarriers may vary according to the subchannels. That is, fewer subcarriers may be defined as the virtual subcarriers in a subchannel having a good SINR characteristic so that more subcarriers therein can be transmitted, while more subcarriers may be defined as the virtual subcarriers in a subchannel having a bad SINR characteristic so that fewer subcarriers therein can be transmitted, thereby improving efficiency in using the SINRs. In Equation (4), the case where $J_A$ has a value of 0 corresponds to the case where the subchannel includes no virtual subcarriers and the selective power control is not performed. The case shown in FIGS. 6A and 6B corresponds to the case where the subchannel includes one virtual subcarrier (J=1) from among the six subcarriers.

The total available transmission power assigned to each subcarrier by the base station having received the information on the virtual subcarrier(s) is expressed as shown below in Equation (5).

$$P_{A,k} = \frac{P_A}{M - J_A}, k \in Set_{A,used} \quad (5)$$

In Equation (5), $P_{A,k}$ denotes a transmission power of a subcarrier k in the subchannel A, and $P_A$ denotes the total transmission power assigned to the subchannel A. Further, $Set_{A,used}$ denotes a set of available subcarrier indexes excluding the virtual subcarrier(s) in the subchannel A. Here, k denotes an index of a subcarrier included in the subchannel A, $J_A$ denotes the number of all virtual subcarriers in the subchannel A, and M denotes the number of all subcarriers included in the subchannel A.

The transmission power of each subchannel from among the entire transmission power which the base station can use can be calculated by Equation (6) below according to the present invention.

$$P_{DL,subch\_k} = SINR_{Target} + [SINR_{Target} - SINR_{subch\_k,reported}] + P_{DL,common} \quad (6)$$

In Equation (6), $P_{DL,subch\_k}$ denotes an output power level assigned to the subchannel k, and $P_{DL,common}$ denotes an output power level commonly assigned to all subchannels in each cell. Further, $SINR_{Target}$ denotes a difference between $P_{DL,common}$ and an output SINR satisfying a Modulation and Coding Scheme (MCS) level required in the subchannel k, and $SINR_{subch\_k,reported}$ denotes a subscriber station reception SINR of the subchannel A feedback by the subscriber station.

In order to reduce the measurement error of the SINR measured and feedback by the subscriber station, Equation (6) can be replaced by Equation (7) shown below.

$$P_{DL,subch\_k}(n) = \lambda SINR_{Target} - SINR_{subch\_k,est}(n-1) + P_{DL,common} \quad (7)$$

In Equation (7), $P_{DL,subch\_k}(n)$ denotes an output power level assigned to the subcarrier with an index k in the subchannel A in a transmission period [nT, (n+1)T], and $P_{DL,common}$ denotes an output power level commonly assigned to all subchannels in each cell. Further, $SINR_{subch\_k,est}(n-1)$ denotes a subscriber station reception SINR of the subchannel A measured and feedback by the subscriber station in a subscriber station reception period [(n−1)T, nT], and λ denotes a forgetting factor used for SINR tracking, which has a value of between 0 and 1.

The value $SINR_{subch\_k,est}(n)$ in Equation (7) is defined as shown below in Equation (8).

$$SINR_{subch\_k,est}(n) = \lambda \times SINR_{subch\_k,reported}(n) + (1-\lambda) \times SINR_{subch\_k,est}(n-1) \quad (8)$$

The reason the virtual subcarrier information as well as the average SINR of each subchannel should be feedback in order to perform efficient power control in the OFDMA system according to the present invention will be described in more detail.

As described above, the optimum power control method is to feedback the SINR information of each subcarrier in order to achieve a water-filling effect. However, as described above, such a method may cause excessive uplink overhead when the feedback information is frequently transmitted. In order to overcome such an overhead problem, only the average SINR should be feedback. Such feedback of only the average SINR cannot effectively deal with the frequency selective channel characteristic of each subcarrier.

Also, the transmission of the SINRs of a limited number of subcarriers causes another problem as follows. When a base station assigns the transmission power to each subchannel, the base station determines the magnitude of the transmission power based on an Modulation and Coding Selection (MCS) level of the subchannel. Here, when a partial water-filling method is employed, that is, when the water-filling method is applied to the particular subcarriers, extra transmission power assigned to the particular subcarriers can be secured by reducing a corresponding portion of the transmission power of the other subcarriers in a corresponding subchannel except for the particular subcarriers. However, because the power-reduced subcarriers actually do not have the same SINR, signals carried to the subscriber station by some of the power-reduced subcarriers may again have bad SINRs. Such a vicious cycle may be repeated.

According to the power control method of the present invention as described above, the virtual subcarriers are disabled in the base station and the transmission power otherwise assignable to the virtual subcarriers are actually redistributed to the other subcarriers in the subchannel actually used in the data transmission, thereby improving the SINRs of the subcarriers used in the data transmission.

Also, if data is carried by the virtual subcarriers for which power-controlled (i.e. to which no power is distributed), the bad SINRs of the virtual subcarriers may increase the probability of error generation. In the method according to the present invention, the virtual subcarriers are disabled, so that the probability of error generation decreases in the data transmission through the subchannel. Processing the virtual subcarriers according to the present invention can have the same effect as that by an Adaptive Modulation and Coding (AMC) according to channel quality information.

A method in which a subscriber station controls the period of feedbacking downlink power control information according to an embodiment of the present invention will be described with reference to FIG. 7. The feedback period control method according to the present invention has an object to enable the subscriber station to reduces the overhead consumed in the feedback of the CQI information when the CQI information feedback by the subscriber station has slow or no change. The feedback period control method according to the present invention employs an exponential CQI feedback cycle control algorithm.

Figure 7:
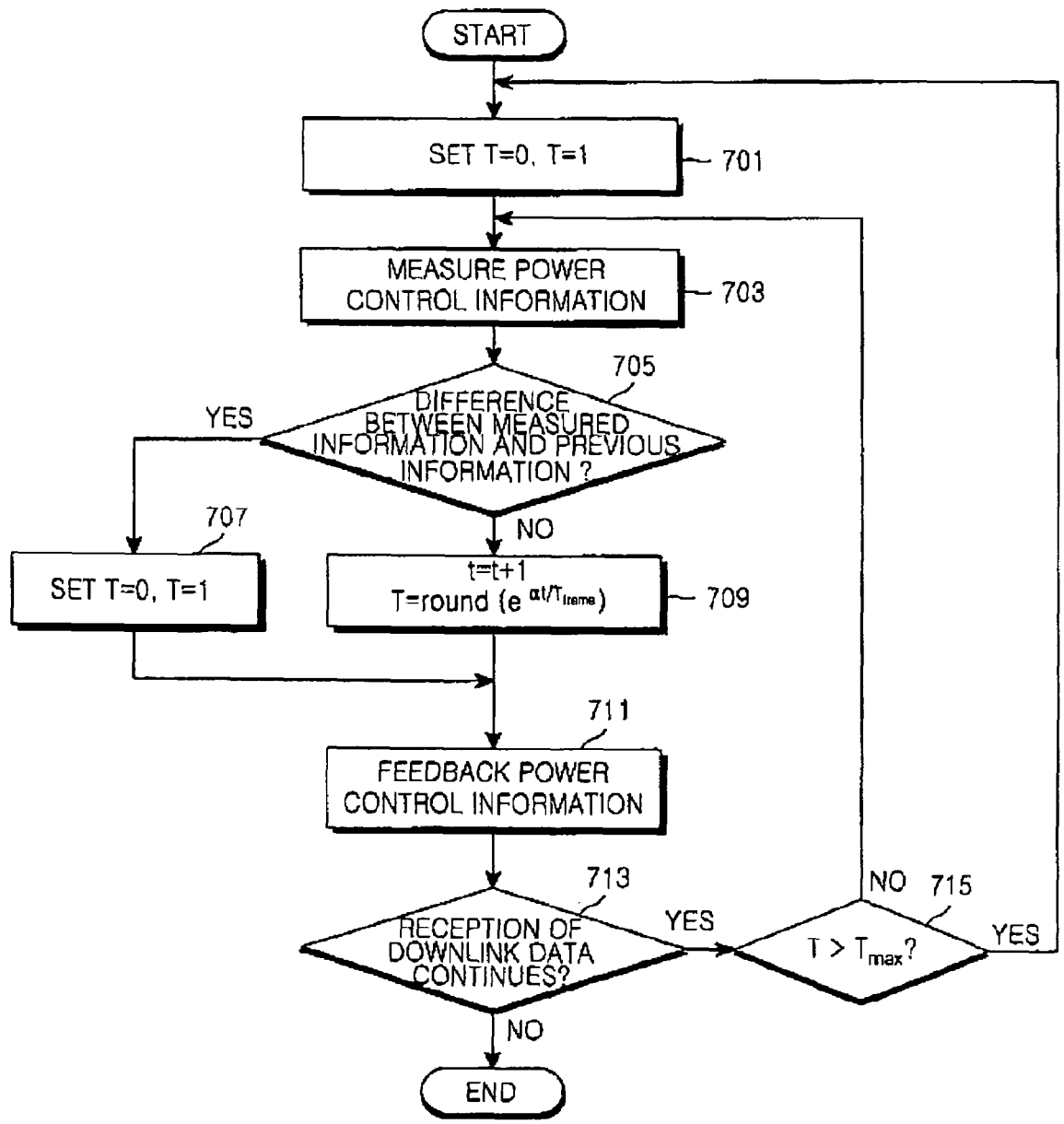
FIG. 7 is a flowchart of a process for feedbacking the power control information in a subscriber station according to an embodiment of the present invention.

FIG. 7 is a flowchart of a process for feedbacking the power control information in a subscriber station according to an embodiment of the present invention.

First, in step 701, a count value t for counting the number of times the feedback is executed is set to zero (t=0), and a feedback period T is set to 1 (T=1). Then, the subscriber station measures the transmission power information from the received pilot signals or preamble signals (step 703). As described above, the subscriber station selects J subcarriers having SINRs below a threshold and calculates an average SINR of the other subcarriers according to the present invention.

The subscriber station determines whether there is a difference between the measured power control information and the previous information (step 705). When the control information difference is large or frequently detected, the period for the feedback of the power control information should be shortened to perform the feedback more frequently. In contrast, when the control information difference is small, it is efficient to lengthen the period for the feedback of the power control information, thereby reducing the overhead.

When the system operates as a TDD system, whether there is difference a between the currently measured information and the previously measured information at T frame before is examined (step 705). In this case, whether there is difference in the CQI information or not can be determined by Equation (9) or (10) shown below.

$$Set_A(n) \neq Set_A(n-1) \quad (9)$$

$$|SINR_{Subch_A}(n) - SINR_{subch_A}(n-1)| \geq \Delta SINR_{allowed} \quad (10)$$

That is, when Equation (9) or (10) is met, it is determined that there is a difference between the currently measured information and the previously measured information. Equation (9) relates to a determination on the possibility of change in the frequency index information of the virtual subcarriers and Equation (10) relates to a determination on the possibility of change of the SINR within an allowed variance of the SINR without feedback.

In the equations, $Set_A(n)$ denotes a set of frequency indexes of the virtual subcarriers in the subchannel A feedback during the time period [nT, (n+1)T], and $SINR_{Subch_A}(n)$ denotes an average SINR of the subchannel A measured during a particular time period [nT, (n+1)T], in which T denotes an OFDMA symbol period.

$\Delta SINR_{allowed}$ denotes a variance of the SINR within the allowance of the SINR without feedback. Therefore, when the difference between the currently measured SINR and the average SINR during the previous time interval is within $\Delta SINR_{allowed}$, it is determined that there is no change in the SINR from among the subchannel information.

As a result of the determination, when there is a difference between the currently measured information and the previously measured information (specifically, when there is change in the frequency index of the virtual subcarriers or the variance of the average SINR of the subchannel exceeds the allowed variance) so that there exists information to be feedback, the count value and the feedback period are reset to zero and one, respectively (t–0, T=1) (step 707). In contrast, when there is no difference between the currently measured information and the previously measured information so that there is no information to be feedback, the count value t is increased and the feedback period is calculated by Equation (11) shown below (step 709).

$$T = \text{round}(e^{\alpha t/T_{frame}}) \quad (11)$$

In Equation (11), α denotes a constant which has a positive real number value and determines a slope of an exponential CQI feedback period, and $T_{frame}$ denotes a frame period measured in the unit of second. According to Equation (11), when the channel condition is stabilized and there is no change between the currently measured information and the previously measured information, the value t increases to lengthen the feedback period of the power control information. As a result, the power control information is feedback relatively less frequently.

The power control information is periodically feedback based on the feedback period T determined in step 707 or 709 (step 711), and whether there exist downlink data to be continuously received is determined (step 713). As a result of the determination, when there is no downlink data to be continuously received, it is unnecessary to feedback the power control information, so the process is ended. In contrast, when there exists downlink data to be continuously received, the above-described power control information feedback process is repeatedly performed.

In step 715, whether or not the calculated feedback period T exceeds a maximum allowed period $T_{max}$ is determined. As a result of the determination, when the feedback period T exceeds the maximum allowed period $T_{max}$, t and T are reset to be 0 and 1, respectively. In contrast, when the feedback period T does not exceed the maximum allowed period $T_{max}$, the above-described power control information feedback process is repeatedly performed.

A power control apparatus of an OFDM communication system according to an embodiment of the present invention will be described with reference to FIGS. 8 and 9.

Figure 8:
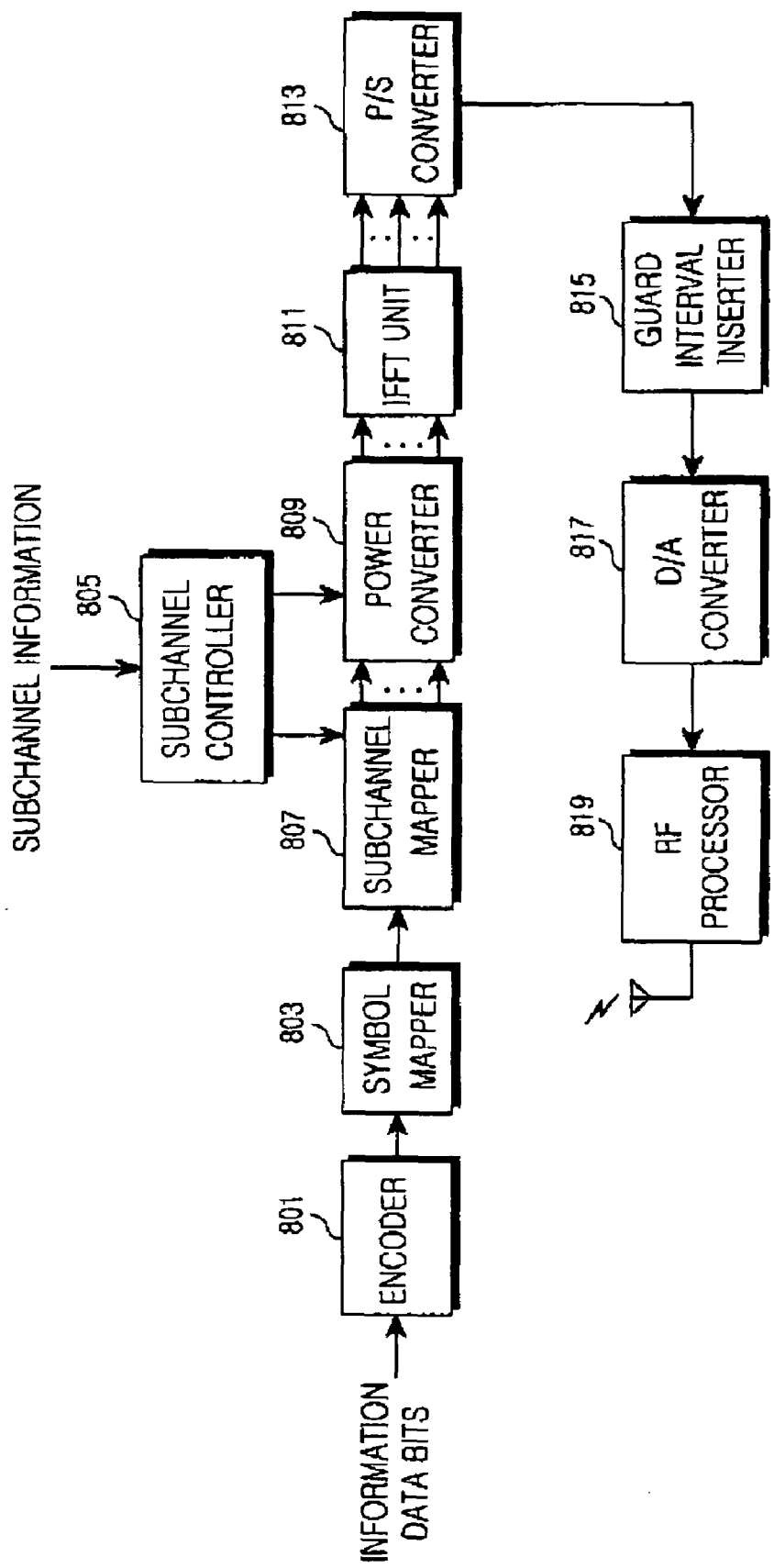
FIG. 8 is a block diagram illustrating a transmitter of an OFDM communication system for performing power control according to an embodiment of the present invention.

FIG. 8 is a block diagram illustrating a transmitter of an OFDM communication system for performing power control according to an embodiment of the present invention.

The base station transmitter includes an encoder 801, a symbol mapper 803, a subchannel controller 805, a subchannel mapper 807, a power converter 809, an IFFT unit 811, a parallel-to-serial converter 813, a guard interval inserter 815, a digital-to-analog converter 817, and a radio frequency (RF) processor 819.

The same blocks as those of the conventional transmitter have the same functions as described above in the prior art, so a repetition of the description is omitted here. Only the subchannel controller 805, the subchannel mapper 807, and the power converter 809 will be described below.

The subchannel mapper 807 receives symbols output from the symbol mapper 803 and maps the symbols to each of the subchannels according to control signals from the subchannel controller 805. The subchannel controller 805 receives the subchannel information as described above from each subscriber station, which includes SINR information of each subchannel and information related to the indexes of the subcarriers to be power-controlled (indexes of the virtual subcarriers), and controls the subchannel mapper 807 and the power converter 809 based on the received subchannel information.

The subchannel mapper 807 maps the received symbols to the subcarriers of a corresponding subchannel excluding the CQI-feedback virtual subcarrier indexes. Then, the power converter 809 adjusts a digital symbol intensity of each subchannel mapped by the subchannel mapper 807.

Here, the adjusted new symbol intensity of each subchannel corresponds to a value obtained by dividing an entire power of a corresponding subchannel given through the digital power assignment to each subchannel by the number of actually used subcarriers in the corresponding subchannel (the number of all subchannels in the corresponding subchannel—the number of virtual subcarriers in the corresponding subchannel). Power control is performed based on the transmission power of each subchannel calculated by the method according to an embodiment of the present invention as described above. Here, the transmission power of each subcarrier in the subchannel has a value obtained by dividing the transmission power of the subchannel by the number of the actually used subcarriers (i.e. the subcarriers in the subchannel excluding the virtual subcarriers).

The subchannel controller 805 assigns power to each subchannel based on the average SINR of each subchannel from among the feedback CQI information. In this case, the intensity of the assigned power can be calculated by Equations (6) and (7) according to the present invention as described above.

Figure 9:
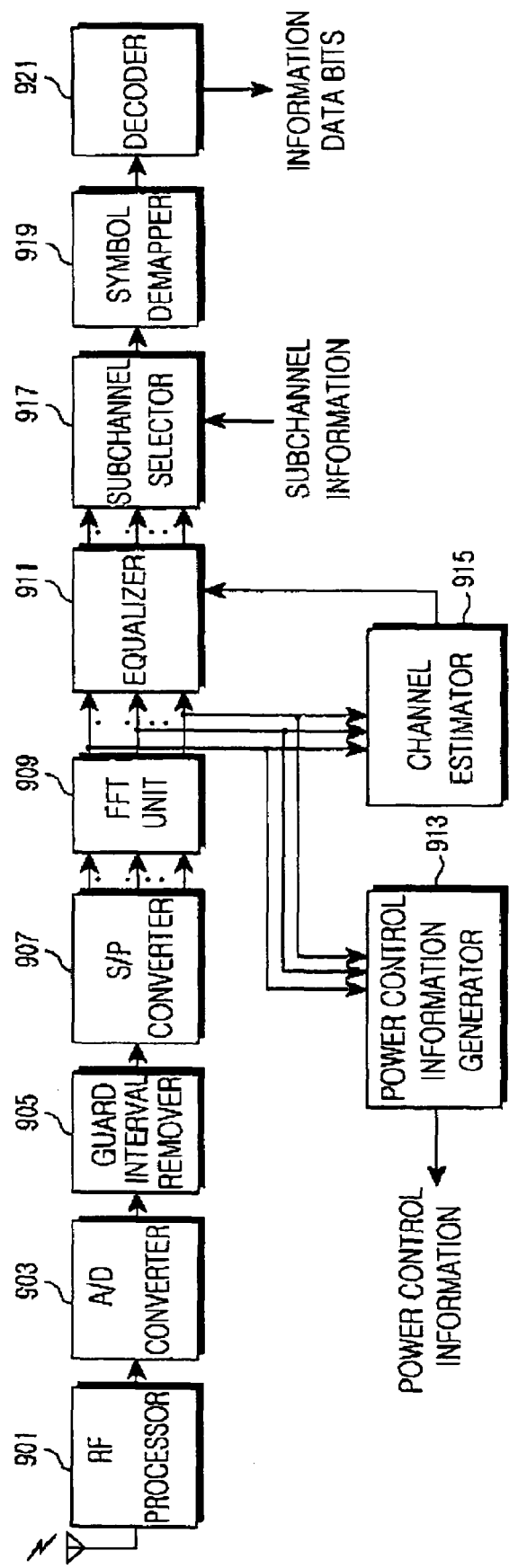
FIG. 9 is a block diagram illustrating a receiver of a subscriber station in an OFDM communication system for feedbacking power control information according to an embodiment of the present invention.

FIG. 9 is a block diagram illustrating a receiver of a subscriber station an OFDM communication system for feedbacking power control information according to an embodiment of the present invention.

Referring to FIG. 9, the receiver of the subscriber station includes an RF processor 901, an analog-to-digital converter 903, a guard interval remover 905, a serial-to-parallel converter 907, an FFT unit 909, an equalizer 911, a subchannel selector 917, a channel estimator 915, a power control information generator 913, a symbol demapper 919, and a decoder 921.

The same blocks as those of the conventional receiver have the same functions as described above in the prior art, so a repetition of the description is omitted here. Only the subchannel selector 917 and the power control information generator 913 will be described below.

The subchannel selector 917 according to the present invention selects input samples for the corresponding subchannel from the frequency domain samples input from the equalizer 911. The subchannel selector 917 selects one subchannel assigned to the receiver from among all of the subchannels based on the information on the one subchannel assigned to the receiver. The total number of the input samples is the same as the size of the FFT unit 909 or the number of the signals FFT-converted by the FFT unit 909.

The subchannel selector 917 according to the present invention buffers the index information of the current CQI-feedback virtual subcarriers and excludes the indexes of the virtual subcarriers in the next time selection of the input samples.

The power control information generator 913 generates the average SINR and the index information of the virtual subcarriers for the corresponding subchannel through pilot signals or preamble signals according to the method of Equations (1) through (8).

The generated power control information is feedback to the base station and the transmission power for each subchannel is controlled based on the power control information.

Figure 10:
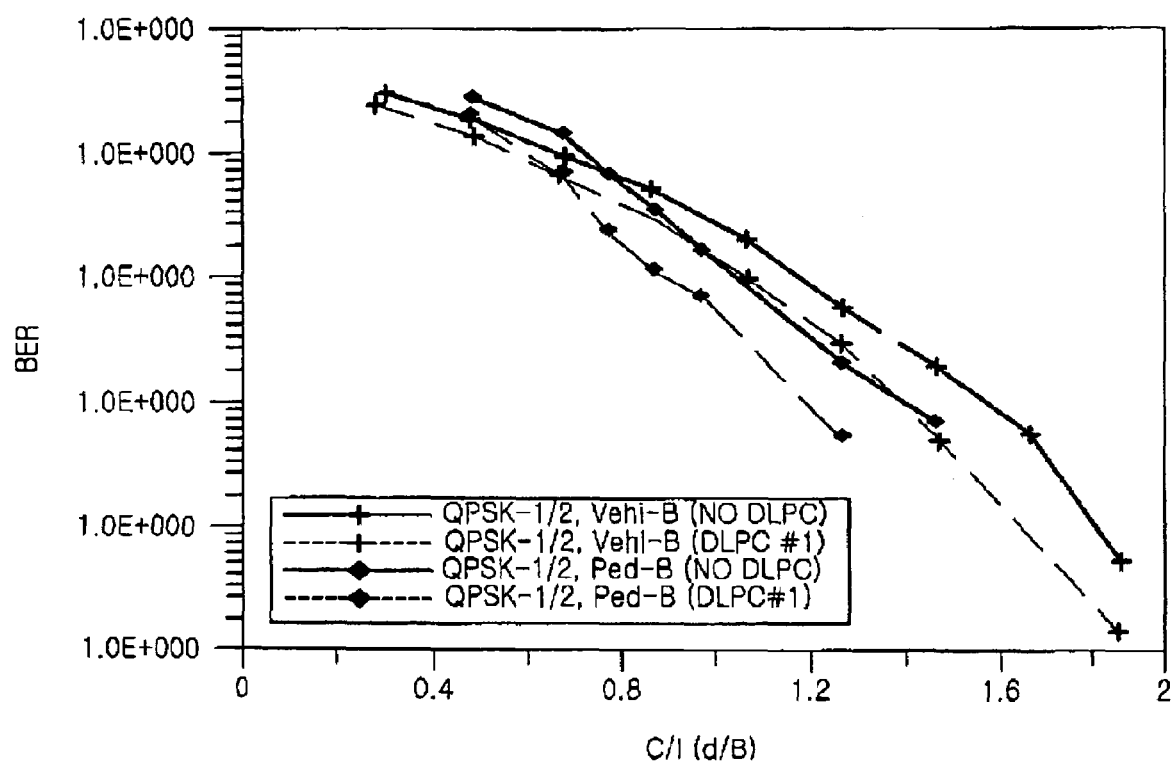
FIG. 10 is a graph comparing the performance of the power control method according to the present invention with performance of the conventional method.

A power control method according to an embodiment of the present invention will be compared with the conventional method with reference to FIG. 10.

FIG. 10 is a graph comparing the performance of the power control method according to the present invention with the performance of the conventional method.

In an OFDMA mobile communication system according to the present invention as described above, report of the CQI for each subchannel achieves minimization of signaling overhead and enables adaptive transmission power control according to the channel conditions and interference. Further, when the present invention is applied to the downlink power control in an OFDMA TDD cellular system, limited transmission power can be effectively used by performing selective power control on subcarriers in a subchannel having a bad SINR distribution which may have a fatal bad influence on the entire reception throughput of the system. Further, the present invention can achieve an automatic reduction of the signal interference generated by virtual subcarriers in a cellular network. In conclusion, the above-mentioned advantages of the present invention can improve the data transmission capacity.

For example, when channel coding is performed in a channel having a selective frequency characteristic, the Hamming distance (or Euclidean distance) is used in dealing with subcarriers having a bad frequency characteristic. In the same way, the transmission rate can be improved by means of a Euclidean distance due to the transmission power increase by the selective power control based on the SINR characteristics of the subcarriers according to the present invention.

The simulation of the graph shown in FIG. 10 employs a Quadrature Phase-Shift Keying (QPSK) scheme as a modulation scheme and a channel coding scheme having a ½ coding rate of a convolutional code for channel coding. Further, the simulation is based on an assumption that each subchannel includes 17 subcarriers in total, including one virtual subcarrier. The curves marked by diamonds represent subscriber stations moving at a speed of 3 km/h and the curves marked by crosses represent subscriber stations moving at a speed of 60 km/h.

FIG. 10 notes that the methods according to the present invention drawn by dotted curves have much smaller Bit Error Rates (BERs) than the conventional methods drawn by solid curves, regardless of the speed of the mobile stations.

According to the present invention as described above, CQI is reported for each subchannel in an OFDMA mobile communication system, thereby minimizing the signaling overhead and enabling the adaptive transmission power control according to the channel conditions and interference. Further, according to the present invention, limited transmission power can be effectively used by performing selective power control on subcarriers in a subchannel having a bad SINR distribution which may have a fatal influence on the entire reception throughput of the system.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling downlink power transmitted from a base station to subscriber stations in a mobile communication system employing an Orthogonal Frequency Division Multiple Access (OFDMA) scheme, in which data is carried from the base station to the subscriber stations by subchannels to each of which a plurality of subcarriers are assigned, the method comprising the steps of:

receiving, from the subscriber stations, an average of channel quality information of the plurality of subcarriers assigned to each of the subchannels together with information related to at least one subcarrier having a channel quality below a predetermined threshold, when a change in at least one of the average of channel quality information and the information related to the at least one subcarrier exceeds an allowed variance;

calculating a transmission power for remaining subcarriers, excluding the at least one subcarrier having the channel quality below the predetermined threshold, among the plurality of subcarriers assigned to each of the subchannels based on a respective average of channel quality information and respective information related to the at least one subcarrier having the channel quality below the predetermined threshold, wherein the at least one subcarrier having the channel quality below the predetermined threshold is disabled and transmission power otherwise assignable to the at least one subcarrier is redistributed to the remaining subcarriers in each of the subchannels used for data transmission; and transmitting data through the remaining subcarriers in each of the subchannels based on the calculated transmission power.

2. The method of claim 1, wherein the channel quality information includes one of a Signal to Noise Ratio (SNR) or Signal to Interference and Noise Ratio (SINR).

3. The method of claim 1, wherein the channel quality information of each of the subchannels is acquired from one of a pilot signal or a preamble signal in each of the subchannels.

4. An apparatus for controlling downlink power transmitted from a base station to subscriber stations in a mobile communication system employing an OFDMA scheme, in which data is carried from the base station to the subscriber stations by subchannels to each of which a plurality of subcarriers are assigned, the apparatus comprising:

a subchannel controller for receiving from the subscriber stations, an average of channel quality information of the plurality of subcarriers assigned to each of the subchannels together with information related to at least one subcarrier having a channel quality below a predetermined threshold, when a change in at least one of the average of channel quality information and the information related to the at least one subcarrier exceeds an allowed variance, and calculating a transmission power for remaining subcarriers, excluding the at least one subcarrier having the channel quality below the predetermined threshold, among the plurality of subcarriers assigned to each of the subchannels based on a respective average of channel quality information and respective information related to the at least one subcarrier having the channel quality below the predetermined threshold, wherein the at least one subcarrier having the channel quality below the predetermined threshold is disabled and the transmission power otherwise assignable to the at least one subcarrier is redistributed to the remaining subcarriers in each of the subchannels used for data transmission;

a subchannel mapper for mapping the data to the remaining subcarriers in each of the subchannels; and a power converter for converting the transmission power for each of the subchannels based on the calculated transmission power.

5. The apparatus of claim 4, wherein the channel quality information includes one of a Signal to Interference Ratio or Signal to Interference and Noise Ratio.

6. The apparatus as claimed in claim 4, wherein the channel quality information of each of the subchannels is acquired from one of a pilot signal or a preamble signal in each of the subchannels.

* * * * *